Aug. 4, 1925.

J. N. HEALD ET AL 1,548,086

CENTERING AND HOLDING WORK IN GRINDING MACHINES

Filed Nov. 8, 1921

Inventors:
James N. Heald.
Alden M. Drake.
By Owen W. Kennedy
Attorney

Patented Aug. 4, 1925.

1,548,086

UNITED STATES PATENT OFFICE.

JAMES N. HEALD AND ALDEN M. DRAKE, OF WORCESTER, MASSACHUSETTS, ASSIGNORS TO THE HEALD MACHINE COMPANY, OF WORCESTER, MASSACHUSETTS, A CORPORATION OF MASSACHUSETTS.

CENTERING AND HOLDING WORK IN GRINDING MACHINES.

Application filed November 8, 1921. Serial No. 513,804.

*To all whom it may concern:*

Be it known that we, JAMES N. HEALD and ALDEN M. DRAKE, citizens of the United States, residing at Worcester, in the county of Worcester and Commonwealth of Massachusetts, have invented new and useful Improvements in Centering and Holding Work in Grinding Machines, of which the following, together with the accompanying drawings, is a specification.

Our invention relates to the construction of and method of using an improved work centering and holding device, especially adapted for employment with grinding machines that are used for the accurate sizing, finishing, or refinishing, of the internal bores of single or multiple cylinder blocks or castings.

Heretofore the handling and lining up of such heavy and cumbersome work, preparatory to the grinding operation, has involved much loss of time, due to the necessity for wedging and blocking up the casting to get it level and at the proper height before it can be finally clamped in position on the work holding device. This extra expenditure of time is largely due to the fact that the jigs or work holding devices heretofore used with cylinder grinding machines have involved, in general, the employment of laborious cut-and-try methods for the centering and levelling of all of the various sizes and types of castings which such a machine must handle.

The work holding device of the present invention embodies a construction and method of use which renders each particular piece of work self-centering and self-levelling, so that the mere act of placing said work on the previously adjusted supporting devices will dispose the cylinder bore or bores in proper relation to the axis of the grinding tool, this allowing the work to be immediately clamped in place without need for further delaying the actual grinding operation. The above and other advantageous features of our invention will hereinafter more fully appear, reference being had to the accompanying drawing, in which, Fig. 1 is a view in side elevation of a grinding machine equipped with an improved work holder embodying our invention.

Similar reference characters refer to similar parts in the different figures.

Figure 1:
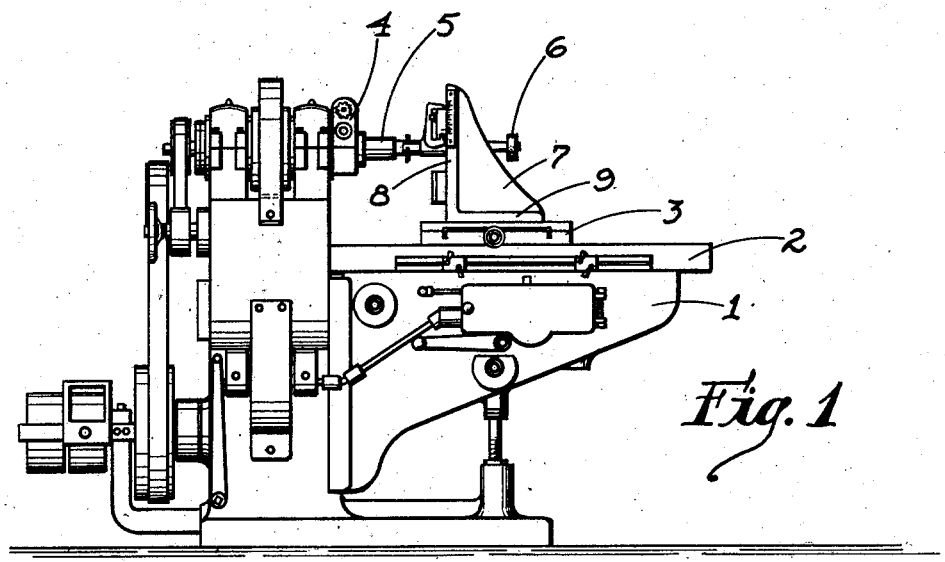

Referring to Fig. 1, the grinding machine to which our improved work holding device is applied comprises the usual base 1 provided with a longitudinally reciprocatory table 2 upon which is mounted a cross slide 3. Suitable means, not shown, are provided for reciprocating the table 2 and for feeding the cross slide 3, and the machine also provides the usual grinding head 4, from which extends a rotatable spindle 5 carrying a grinding tool 6, the latter adapted to travel in a circular path whose axis is coincident with the longitudinal axis of the cylinder bore or through the hole to be internally ground. The parts of the grinding machine described thus far form no part of the present invention, but are merely shown for the purpose of illustration, it being fully understood that our invention may be applied to other and different forms of internal grinding apparatus.

Figures 2, 3:
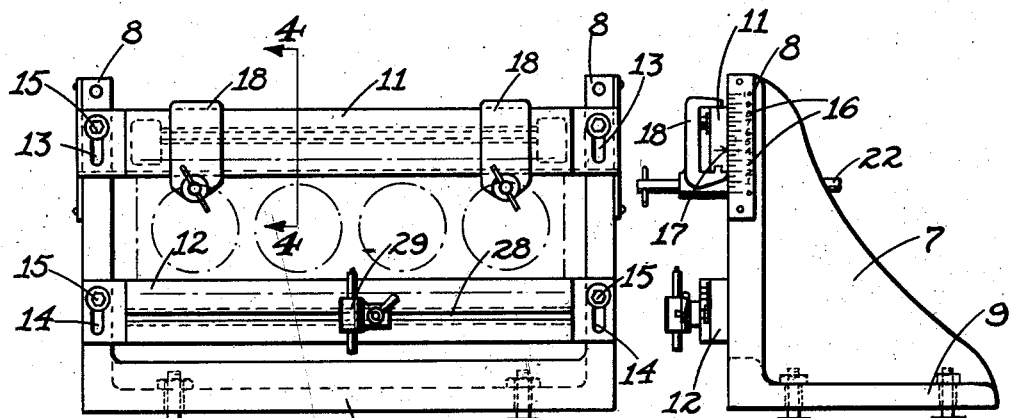
Fig. 2 is an enlarged view, in side elevation, of the work holder shown in Fig. 1.
Fig. 3 is a view, in front elevation, of the work holder shown in Fig. 2.

Our improved work centering and holding device is mounted on the table 3 and comprises a casting 7, which, as best shown in Figs. 2 and 3, consists of upwardly extending end sections 8 connected by a base plate 9. The plate 9 rests on the table 3 and is clamped thereto by bolts 10.

Figure 4:
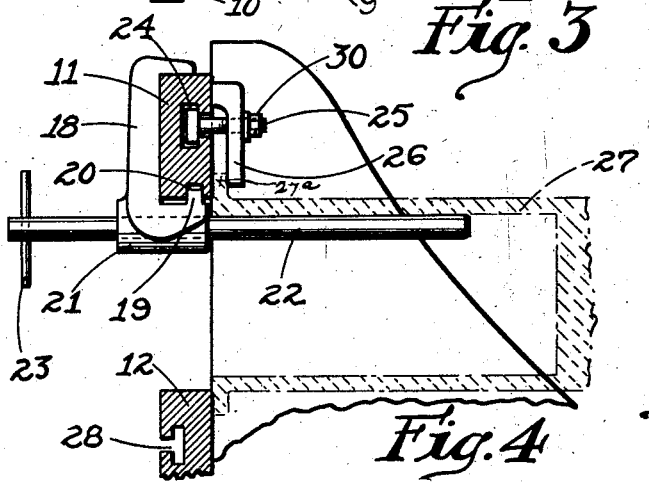
Fig. 4 is an enlarged sectional view along the line 4—4 of Fig. 3.

A pair of bars 11 and 12 are respectively provided at their ends with slots 13 and 14, and each bar is adjustably secured to the end sections 8 by means of bolts 15 received in the slots 13 and 14. As best shown in Fig. 2, each end section 8 is provided with a number of scale markings 16, which are adapted to be read in connection with an index mark 17 provided on each end of the upper bar 11,—said markings 16 indicating various internal cylinder diameters, such as 3", 3½", 4", etc., so arranged that when registered with index 17, each corresponds to a definite vertical displacement of a rod 22 from the axis of the grinding circle, as hereinafter described. A pair of locating brackets 18, 18 are slidably mounted on the upper bar 11 and, as best shown in Fig. 4, each bracket 18 is provided with a lug 19 that is received in a groove 20 provided on the under side of the bar 11 in order to properly guide the brackets 18 on the bar. Each bracket 18 is provided with a boss 21 having an opening extending therethrough for the reception of a rod 22. The rod 22 fits closely in the opening in the boss 21, but is capable of being withdrawn therefrom by means of a handle 23.

The bar 11 is further provided with a T-slot 24, extending longitudinally thereof, for receiving the heads of bolts 25, by means of which clamping members 26 may be secured to the bar 11 for holding a cylinder block or casting 27 in position thereon, as will be hereinafter described. The lower bar 12 is also provided with a T-slot 28, by means of which a diamond holder 29 may be moved along and clamped in different positions on the bar 12 for truing up the grinding tool 6.

When it is desired to secure a cylinder block or casting in position for grinding in the machine, the operator first ascertains the diameter of the bore or bores in the casting, and then moves the upper bar 11 to such a position that the index marks 17 register with the scale marks 16 which correspond to the ascertained diameter, as for instance 4″; this, as above indicated, disposes the rods 22, for the conditions assumed, in such a position that their farthest removed or upper surfaces are exactly 2″ above the horizontal plane of the axis of the grinding circle. The bar 11 is then clamped in this position by means of the bolts 15. The operator then slides the locating brackets 18 along the bar 11 until the brackets 18 are about the same distance apart as the extreme end bores of the multiple cylinder casting 27, after which the casting is lifted up so that the rods 22 may enter the end holes to support said casting, as indicated by the dot and dash lines in Fig. 3; with a single-cylinder casting, obviously only one rod 22 is employed.

When a multiple cylinder casting is thus suspended on the two rods 22, the weight of said casting, in seeking to reach its lowest possible position, causes the said rods to shift laterally until they position themselves directly above the center line of each cylinder bore, this action being permitted by the fact that the brackets 18, carrying said rods, slide easily along the bar 11. Therefore, owing to the previous setting of said bar 11, in exact conformity to the ascertained or known bore diameter, this suspension of the casting above described, brings the axes of all the bores into the same horizontal plane which contains the axis of the grinding circle; and also insures an absolutely level disposition of the casting, since the two elongated suspension rods 22 are necessarily true and parallel with the supporting surface or ways of the base 1.

With the casting thus accurately positioned and lined up, it only remains for the operator to positively clamp its flange 27a to the bar 11 by means of the clamping members 26 and nuts 30 coacting with the bolts in the T-slot 24. After the cylinder casting 27 has been so secured to the bar 11, the rods 22 can be withdrawn from the end openings by pulling out the handles 23, after which the locating brackets 18 can be slid along the bar 11 until they are completely out of the way of the grinding tool 6, as the latter, by cross feed of the slide 3, is lined up with each bore, in position to traverse the same by longitudinal movement of the table 2.

The slot 28 in the lower bar 12 permits the operator to quickly move the diamond holder 29 to a position below the bore which it is desired to grind, so that the grinding tool 6 may be quickly and accurately trued up, following which the diamond holder can be moved out of the way.

From the foregoing, it is apparent that by our invention we have provided an improved fixture for use in connection with grinding machines, by the use of which it is possible to first quickly and accurately locate a cylinder block or casting and then clamp it in position for grinding, after which the locating means can be moved out of the way of the grinding tool. Furthermore our improved fixture provides means whereby the grinding tool can be readily trued up before it enters a hole on the casting. It is also obvious that our improved fixture is adapted to be used in connection with castings of almost any size, inasmuch as the scale index markings on the fixture casting and on the upper bar, respectively, provide means whereby the fixture can be readily adjusted to accommodate different sizes of holes that are to be ground.

While we have shown our invention as applied to a particular arrangement of parts of a grinding machine, it is not so limited but is susceptible of various modifications within the scope of the appended claims.

We claim,

1. In a work holding device of the class described, a vertically adjustable supporting member, and a rod extending longitudinally therefrom for the temporary suspension of an apertured workpiece by engagement with its inner periphery.

2. In a work holding device of the class described, a supporting member, a rod extending longitudinally therefrom for the temporary suspension of an apertured workpiece by engagement with its inner periphery, and means for adjusting said supporting member vertically, to vary the displacement of said rod from the axis of the grinding circle for workpieces of different internal diameters.

3. A grinding machine having a rotary grinding tool with a fixed axis of orbital movement, provided with a transverse work supporting bar adapted for vertical adjustment, and a longitudinal member removably carried by said bar and adapted for the temporary suspension of a workpiece by contact with its internal periphery so that proper adjustment may be made of said workpiece to be internally ground.

4. A grinding machine having a rotary grinding tool with a fixed axis of orbital movement, provided with a transverse work supporting bar adapted for vertical adjustment, and a longitudinal member removably carried by said bar and adapted for the temporary suspension of an apertured workpiece by contact with its inner periphery, and means for indicating the vertical adjustment of said bar in accordance with the vertical displacement of said member from said axis.

5. In a device for supporting a non-rotary apertured workpiece for internal grinding, with the axis of its bore in alinement with the axis of orbital movement of a grinding tool, a work suspending member for longitudinal contact with said bore, a transverse supporting bar for said member, and means for indicating, by vertical adjustment of said bar, the vertical displacement of said member's contact surface from said orbital axis, whereby the adjustment of said bar, in accordance with the known diameter of said bore, will procure the suspension of the workpiece with the axis of its bore in the same horizontal plane as said orbital axis.

6. In a device for supporting a non-rotary apertured workpiece for internal grinding, with the axis of its bore in alinement with the axis of orbital movement of a grinding tool, a work suspending member for longitudinal contact with said bore, a transverse supporting bar for said member, means for indicating, by vertical adjustment of said bar, the vertical displacement of said member's contact surface from said orbital axis, whereby the adjustment of said bar, in accordance with the known diameter of said bore, will procure the suspension of the workpiece with the axis of its bore in the same horizontal plane as said orbital axis, and means permitting transverse movement of said member on said bar.

7. In a device for supporting a non-rotary apertured workpiece for internal grinding, with the axis of its bore in alinement with the axis of orbital movement of a grinding tool, a work suspending member for longitudinal contact with said bore, a transverse supporting bar for said member, means for indicating, by vertical adjustment of said bar, the vertical displacement of said member's contact surface from said orbital axis, whereby the adjustment of said bar, in accordance with the known diameter of said bore, will procure the suspension of the workpiece with the axis of its bore in the same horizontal plane as said orbital axis, and means for clamping the workpiece to said bar in advance of the removal of said suspending member.

8. In a work holding device for use with internal grinding machines, means for suspending an apertured workpiece by longitudinal engagement with an inner peripheral surface, whereby to level and aline said workpiece with reference to the axis of the grinding circle, and an adjustment for said suspension means, by which is indicated the position in which it is to be fixed for workpieces of various internal diameters.

9. In a fixture for grinding machines, the combination with a work supporting bar, of a work locating device and a work clamping device positionable along said bar.

10. In a work holding device for grinding machines, the combination with a longitudinally slotted work supporting bar, of a work locating bracket slidable along said bar, and a work holding clamp adjustable in said slot.

11. A work holding device for grinding machines, comprising a vertically adjustable longitudinally slotted bar provided with work locating brackets positionable along said bar, and work clamping members adjustable in said slot.

12. In a device for mounting cylinder blocks for grinding, the combination with a work supporting bar, of brackets freely movable along said bar, and rods removably carried by said brackets for the suspension of a cylinder block by entrance into one or more of its bores.

13. In a device for mounting cylinder blocks for grinding, the combination with a work supporting bar, of brackets freely movable along said bar and provided with portions extending transversely of said bar for the suspension of a cylinder block by entrance into one or more of its bores.

14. In a device for mounting cylinder blocks for grinding, the combination with a work supporting bar, of brackets freely movable along said bar and provided with rods extending transversely of the bar, the said rods being displaced a predetermined vertical distance above the axis of the grinding circle, whereby the suspension of a cylinder block thereon alines the axis of its bore with the axis of said circle.

15. In a device for supporting a non-rotary apertured workpiece for internal grinding, with the axis of its bore in alinement with the axis of orbital movement of a grinding tool, a work suspending member for longitudinal contact with said bore, and a transverse supporting bar for said member, and means permitting transverse movement of said member on said bar.

16. In a device for supporting a nonrotary apertured workpiece for internal grinding, with the axis of its bore in alinement with the axis of orbital movement of a grinding tool, a work suspending member for longitudinal contact with said bore, and a transverse supporting bar for said member, means permitting transverse movement of said member on said bar, and means for clamping the workpiece to said bar in advance of the removal of said suspending member.

17. In a work holding device for use with internal grinding machines, means for suspending an apertured workpiece by longitudinal engagement with an inner peripheral surface, whereby to level and aline said workpiece with reference to the axis of the grinding circle.

18. In a grinding machine, means for alining a block with a series of equal cylinders of revolution, having their axes in the same plane, consisting of means for supporting said block at three or more points so that the supporting points will dispose themselves in a plane tangent to all the cylinders, means for raising and lowering said supporting points combined with a grinding spindle, whose axis of orbit forms a line parallel to all the planes of the supporting points as they are raised and lowered, so that the axis of orbit of the grinding spindle may be made to lie in the plane of axes of the cylinders.

19. In a grinding machine, means for alining a block containing a cylinder of revolution, consisting of means for supporting said block at two or more points so that the supporting points will dispose themselves in the vertical plane of the axis of said cylinder, means for raising and lowering said supporting points combined with a grinding spindle whose axis of orbit forms a line parallel to all the horizontal planes of the supporting points as they are raised and lowered, so that the axis of orbit of the grinding spindle may be made to lie in the horizontal plane of axis of the cylinder.

Dated this 7th day of November, 1921.

JAMES N. HEALD.
ALDEN M. DRAKE.